(12) United States Patent
Hu et al.

(10) Patent No.: US 12,483,175 B2
(45) Date of Patent: Nov. 25, 2025

(54) MOTOR DRIVER

(71) Applicant: Delta Electronics, Inc., Taoyuan (TW)

(72) Inventors: Kai-Wei Hu, Taoyuan (TW); Yi-Jui Chen, Taoyuan (TW); Chih-Hung Chen, Taoyuan (TW); Lei-Chung Hsing, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 178 days.

(21) Appl. No.: 18/403,676

(22) Filed: Jan. 3, 2024

(65) Prior Publication Data

US 2024/0322729 A1    Sep. 26, 2024

Related U.S. Application Data

(60) Provisional application No. 63/454,512, filed on Mar. 24, 2023.

(30) Foreign Application Priority Data

Sep. 14, 2023 (CN) .......................... 202311188152.4

(51) Int. Cl.
*H02P 27/06* (2006.01)
*H02M 1/32* (2007.01)
(Continued)

(52) U.S. Cl.
CPC ............ *H02P 27/06* (2013.01); *H02M 1/327* (2021.05); *H02M 7/003* (2013.01); *H02M 7/53871* (2013.01)

(58) Field of Classification Search
CPC .... H02M 7/003; H02M 7/537; H02M 1/0048; H02M 1/327; H02M 1/32; H02M 7/5387;
(Continued)

(56) References Cited

U.S. PATENT DOCUMENTS

| | | |
|---|---|---|
| 5,281,900 A | 1/1994 | Park |
| 2004/0062004 A1* | 4/2004 | Pfeifer ................. H01L 23/473 |
| | | 257/E23.098 |
| 2023/0023514 A1 | 1/2023 | Shima et al. |

FOREIGN PATENT DOCUMENTS

| | | |
|---|---|---|
| CN | 209805686 U | 12/2019 |
| CN | 209823635 U | 12/2019 |

(Continued)

*Primary Examiner* — Antony M Paul
(74) *Attorney, Agent, or Firm* — KIRTON McCONKIE; Evan R. Witt

(57) ABSTRACT

A motor driver is provided. The motor driver includes an AC/DC converter, a DC/AC converter, a heat dissipation plate and a busbar module. The AC/DC converter converts an AC input power to a DC power and includes a first thermal module, a second thermal module, a first capacitor pack and a second capacitor pack. The DC/AC converter is connected with the AC/DC converter, converts the DC power to an AC output power, and includes a third thermal module. The heat dissipation plate includes an upper surface and a lower surface. The first thermal module is disposed on the upper surface. The second thermal module and the third thermal module are disposed on two opposite surfaces, respectively. The first capacitor pack is disposed on the upper surface. The second capacitor pack is disposed on the lower surface and corresponding to the first capacitor pack.

10 Claims, 7 Drawing Sheets

(51) Int. Cl.
*H02M 7/00* (2006.01)
*H02M 7/5387* (2007.01)

(58) Field of Classification Search
CPC ..... H02M 1/0077; H02M 7/797; H02P 27/06; H05K 7/2089; H05K 7/20927; H05K 7/209; H02K 44/085
See application file for complete search history.

(56) References Cited

FOREIGN PATENT DOCUMENTS

| | | |
|---|---|---|
| CN | 211531652 U | 9/2020 |
| CN | 213028873 U | 10/2020 |
| CN | 115635453 A | 1/2023 |
| CN | 115940578 A | 4/2023 |

\* cited by examiner

MOTOR DRIVER

CROSS-REFERENCE TO RELATED APPLICATION

This application claims the benefit of U.S. Provisional Application No. 63/454,512 filed on Mar. 24, 2023, and entitled "MOTOR DRIVER", the entirety of which is hereby incorporated by reference. This application also claims the priority to China Patent Application No. 202311188152.4 filed on Sep. 14, 2023, the entirety of which is hereby incorporated by reference.

FIELD OF THE INVENTION

The present disclosure relates to a motor driver, and more particularly to a motor driver for reducing the volume and the leakage inductance and improving the heat dissipation thereof.

BACKGROUND OF THE INVENTION

Motor driver is an electricity controlling device for changing the output voltage and the output frequency to control the AC electrical machine. The motor driver is connected between a power grid and a motor and includes an input rectifying circuit, a DC capacitor module and an output converter circuit. The input rectifying circuit, the DC capacitor module and the output converter circuit are connected between the power grid and the motor in series and in sequence. The input rectifying circuit includes three diode bridge arms disposed in parallel. The input rectifying circuit converts the AC input power provided from the power grid to a DC power. The output converter circuit converts the DC power to an AC output power to the motor. However, the thermal module of the motor driver including the input rectifying circuit and the output converter circuit is disposed on the same side of the heat dissipation element. Consequently, the unavailable area of the heat dissipation element is increased, and the heat dissipation density is reduced so as to reduce the power density of the motor driver.

Therefore, there is a need of providing a motor driver so as to overcome the drawbacks of the conventional technologies.

SUMMARY OF THE INVENTION

An object of the present disclosure provides a motor driver. Two of the three thermal modules of the motor driver of the present disclosure are disposed on the upper surface of the heat dissipation plate. One of the three thermal modules of the motor driver of the present disclosure is disposed on the lower surface of the heat dissipation plate. The motor driver of the present disclosure has double-sided cooling technology for enhancing the available area of assembling and the heat dissipation density of the heat dissipation plate and reducing the volume of heat dissipation plate, so as to enhance the power density of the motor driver. Moreover, the first capacitor pack and the second capacitor pack of the motor driver are symmetrically disposed on the two opposite sides of the heat dissipation plate. Consequently, the power transmission path is reduced so as to reduce the loop leakage inductance. Moreover, the capacitor module has advantage of equalizing current and reducing cost.

In accordance with an aspect of the present disclosure, a motor driver is provided. The motor driver includes an AC/DC converter, a DC/AC converter, a heat dissipation plate and a busbar module. The AC/DC converter converts an AC input power to a DC power and includes a first thermal module, a second thermal module, a first capacitor pack and a second capacitor pack. The DC/AC converter is connected with the AC/DC converter, converts the DC power to an AC output power, and includes a third thermal module. The heat dissipation plate includes an upper surface and a lower surface. The first thermal module is disposed on the upper surface. One of the second thermal module and the third thermal module is disposed on the lower surface and the other one of the second thermal module and the third thermal module is disposed on the upper surface. The first capacitor pack is disposed on the upper surface. The second capacitor pack is disposed on the lower surface and corresponding to the first capacitor pack.

In accordance with another aspect of the present disclosure, a motor driver is provided. The motor driver includes an AC/DC converter, a DC/AC converter, a heat dissipation plate and a busbar module. The AC/DC converter converts an AC input power to a DC power and includes a first thermal module, a first capacitor pack and a second capacitor pack. The DC/AC converter is connected with the AC/DC converter, converts the DC power to an AC output power, and includes a second thermal module. The heat dissipation plate includes an upper surface and a lower surface. The first thermal module is disposed on the upper surface. The second thermal module is disposed on the upper surface or the lower surface. The first capacitor pack is disposed on the upper surface. The second capacitor pack is disposed on the lower surface and corresponding to the first capacitor pack. The busbar module includes a first busbar and a second busbar. The first busbar is disposed between the upper surface and the first capacitor pack and includes at least one busbar connection terminal. The second busbar is disposed between the lower surface and the second capacitor pack and includes at least one busbar connection terminal. The at least one busbar connection terminal of the first busbar and the at least one busbar connection terminal of the second busbar penetrate through the heat dissipation plate to connect with each other. The first thermal module of the AC/DC converter is disposed between the upper surface and the first busbar. The second thermal module of the DC/AC converter is disposed between the lower surface and the second busbar.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
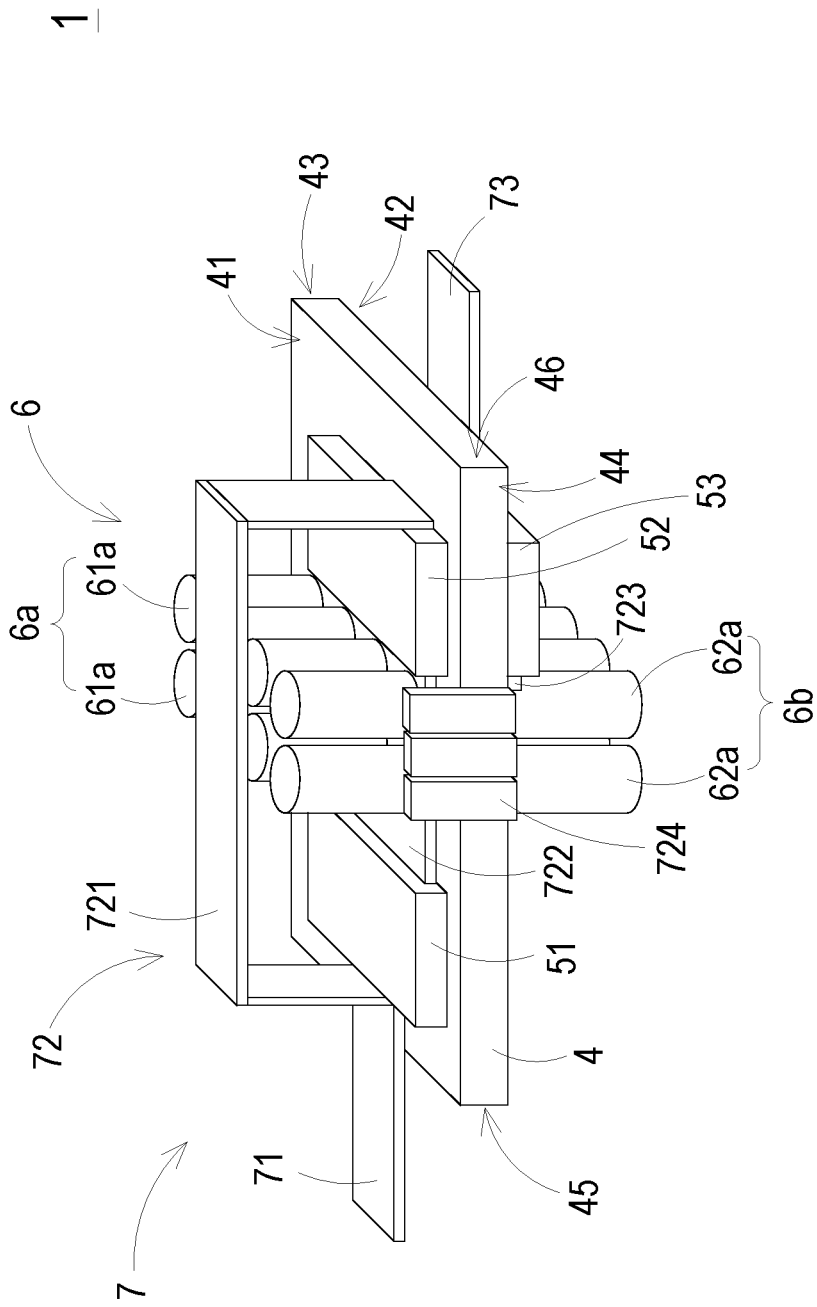
FIG. 1 is a schematic perspective view illustrating a motor driver according to a first embodiment of the present disclosure.
Figure 2:
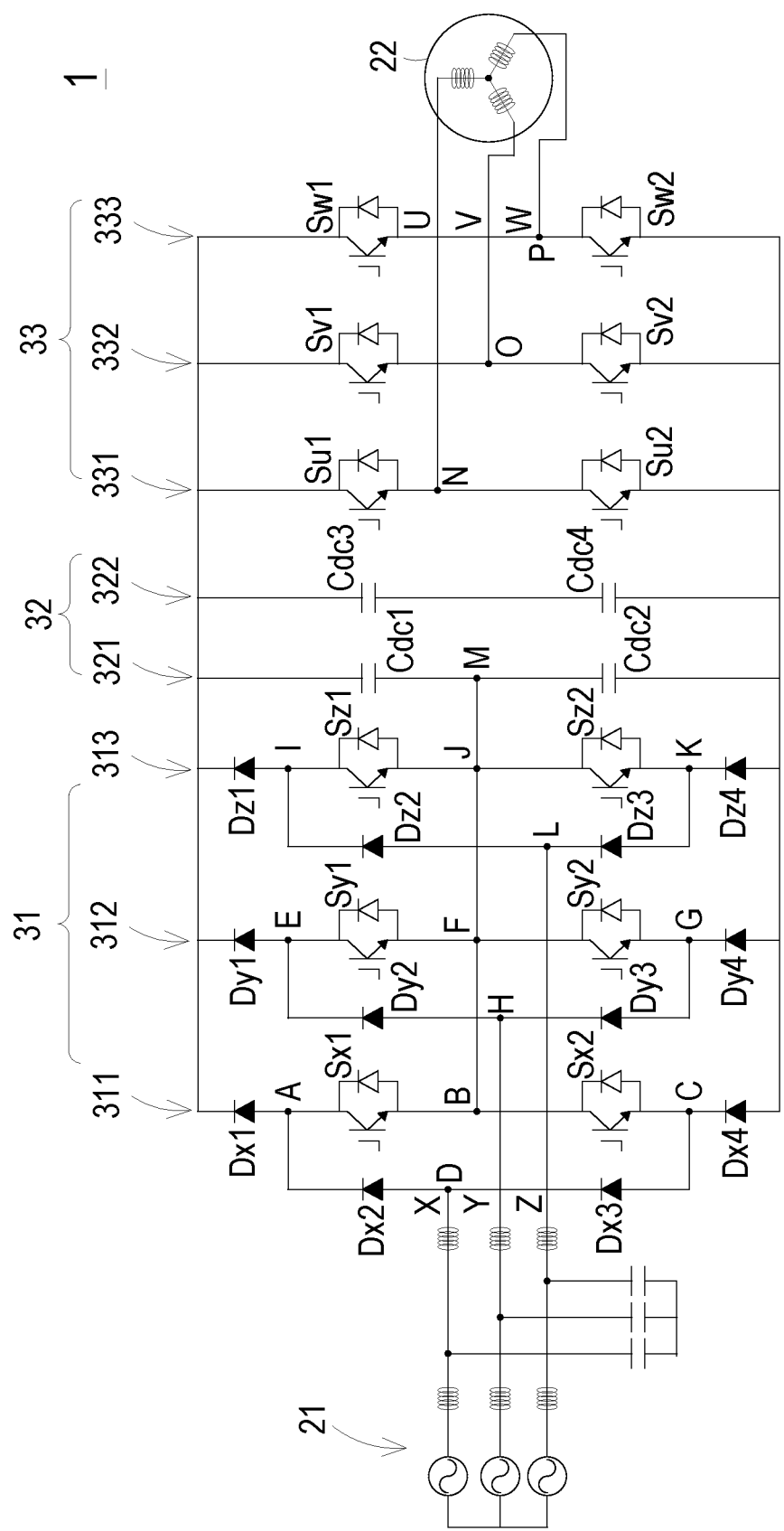
FIG. 2 is a schematic equivalent circuit diagram illustrating a first embodiment of the motor driver of the present disclosure.

FIG. 1 is a schematic perspective view illustrating a motor driver according to a first embodiment of the present disclosure. FIG. 2 is a schematic equivalent circuit diagram illustrating a first embodiment of the motor driver of the present disclosure. In the circuit structure of the motor driver, as shown in FIG. 2, the motor driver 1 of this embodiment is connected between a power grid 21 and a motor 22. The power grid 21 is an external AC power source. The power gird 21 provides an AC input power which is a three-phase AC power. The power grid 21 provides the AC input power through an X phase, a Y phase and a Z phase of FIG. 2. The motor driver 1 converts the AC input power of the power grid 21 to an AC output power and provides the AC output power to the motor 22. The motor 22 is an AC motor to receive the AC output power which is a three-phase AC power. The motor 22 receives the AC output power outputted from the motor driver 1 through a U phase, a V phase and a W phase of FIG. 2. The motor driver 1 includes an AC/DC converter 31, a capacitor module 32 and a DC/AC converter 33. The AC/DC converter 31 is connected with the power grid 21. The AC/DC converter 31 converts the AC input power of the power grid 21 to a DC power and provides the DC power to the capacitor module 32 and the DC/AC converter 33. The DC/AC converter 33 converts the DC power to the AC output power and provides the AC output power to drive and control the motor 22 to rotate. The detail structure is described below.

In this embodiment, the AC/DC converter 31 is a three-level converter and includes a first bridge arm 311, a second bridge arm 312 and a third bridge arm 313. The first bridge arm 311 includes a first main diode Dx1, a first transistor Sx1, a second transistor Sx2, a second main diode Dx4, a first parallel diode Dx2 and a second parallel diode Dx3. The first main diode Dx1, the first transistor Sx1, the second transistor Sx2, the second main diode Dx4 are connected in series and in sequence. A connection node between the first main diode Dx1 and the first transistor Sx1 is a first node A. A connection node between the first transistor Sx1 and the second transistor Sx2 is a second node B. A connection node between the second transistor Sx2 and the second main diode Dx4 is a third node C. The first parallel diode Dx2 and the second parallel diode Dx3 are connected between the first node A and the third node C in series. A connection node between the first parallel diode Dx2 and the second parallel diode Dx3 is a fourth node D. The fourth node D is connected with the X phase of power grid 21.

The second bridge arm 312 and the first bridge arm 311 are connected in parallel and includes a third main diode Dy1, a third transistor Sy1, a fourth transistor Sy2, a fourth main diode Dy4, a third parallel diode Dy2 and a fourth parallel diode Dy3. The third main diode Dy1, the third transistor Sy1, the fourth transistor Sy2 and the fourth main diode Dy4 are connected in series and in sequence. A connection node between the third main diode Dy1 and the third transistor Sy1 is a fifth node E. A connection node between the third transistor Sy1 and the fourth transistor Sy2 is a sixth node F. A connection node between the fourth transistor Sy2 and the fourth main diode Dy4 is a seventh node G. The third parallel diode Dy2 and the fourth parallel diode Dy3 are connected between the fifth node E and the seventh node G in series. A connection node between the third parallel diode Dy2 and the fourth parallel diode Dy3 is an eighth node H. The eighth node H is connected with the Y phase of the power grid 21.

The third bridge arm 313, the second bridge arm 312 and the first bridge arm 311 are connected in parallel and includes a fifth main diode Dz1, a fifth transistor Sz1, a sixth transistor Sz2, a sixth main diode Dz4, a fifth parallel diode Dz2 and a sixth parallel diode Dz3. The fifth main diode Dz1, the fifth transistor Sz1, the sixth transistor Sz2 and the sixth main diode Dz4 are connected in series and in sequence. A connection node between the fifth main diode Dz1 and the fifth transistor Sz1 is a ninth node I. A connection node between the fifth transistor Sz1 and the sixth transistor Sz2 is a tenth node J. A connection node between the sixth transistor Sz2 and the sixth main diode Dz4 is an eleventh node K. The fifth parallel diode Dz2 and the sixth parallel diode Dz3 are connected between the ninth node I and the eleventh node K in series. A connection node between the fifth parallel diode Dz2 and the sixth parallel diode Dz3 is a twelfth node L. The twelfth node L is connected with the Z phase of the power grid 21. The tenth node J, the sixth node F and the second node B are connected among each other.

The capacitor module 32 is a DC power storage capacitor module and connected with the first bridge arm 311, the second bridge arm 312 and the third bridge arm 313 of the AC/DC converter 31 in parallel to storage the DC power of the AC/DC converter 31. The capacitor module 32 includes a fourth bridge arm 321 and a fifth bridge arm 322. The fourth bridge arm 321 includes a first upper capacitor Cdc1 and a first lower capacitor Cdc2 connected with each other in series. A connection node between the first upper capacitor Cdc1 and the first lower capacitor Cdc2 is a thirteenth node M. The thirteenth node M is connected with the tenth node J, the sixth node F and the second node B. The fifth bridge arm 322 are connected with the fourth bridge arm 321 in parallel. The fifth bridge arm 322 includes a second upper capacitor Cdc3 and a second lower capacitor Cdc4 connected with each other in series.

The DC/AC converter 33 is connected with the capacitor module 32 in parallel for receiving the DC power stored by the capacitor module 32 and converting the DC power to the AC output power to the motor 22. The DC/AC converter 33 includes a sixth bridge arm 331, a seventh bridge arm 332 and an eighth bridge arm 333. The sixth bridge arm 331 includes a seventh transistor Su1 and an eighth transistor Su2. The seventh transistor Su1 and the eighth transistor Su2 are connected with each other in series. A connection node between the seventh transistor Su1 and the eighth transistor Su2 is a fourteenth node N. The fourteenth node N is connected with the U phase of the motor 22. The seventh bridge arm 332 and the sixth bridge arm 331 are connected with each other in parallel. The seventh bridge arm 332 includes a ninth transistor Sv1 and a tenth transistor Sv2. The ninth transistor Sv1 and the tenth transistor Sv2 are connected with each other in series. A connection node between the ninth transistor Sv1 and the tenth transistor Sv2 is a fifteenth node O. The fifteenth node O is connected with the V phase of motor 22. The eighth bridge arm 333 is connected with the sixth bridge arm 331 and the seventh bridge arm 332 in parallel. The eighth bridge arm 333 includes an eleventh transistor Sw1 and a twelfth transistor Sw2. The eleventh transistor Sw1 and the twelfth transistor Sv2 are connected with each other in series. A connection node between the eleventh transistor Sw1 and the twelfth transistor Sw2 is a sixteenth node P. The sixteenth node P is connected with the W phase of motor 22.

In the practical structure of the motor driver 1 relate to the heat transferring, as shown in FIG. 1, the motor driver 1 includes a heat dissipation plate 4, a first thermal module 51, a second thermal module 52, a third thermal module 53, a capacitor module 6 and a busbar module 7. The heat dissipation plate 4 is constructed by a water cooling plate or a liquid cooling plate. The heat dissipation plate 4 includes an upper surface 41, a lower surface 42, a first lateral wall 43, a second lateral wall 44, a third lateral wall 45 and a fourth lateral wall 46. The conventional heat dissipation element is connected the elements of the motor driver with single side through the fin of the conventional heat dissipation element. Compared with the conventional heat dissipation element, both of the upper surface 41 and the lower surface 42 of the heat dissipation plate 4 of the present disclosure can be connected with other elements of the motor driver 1 so as to enhance the heat dissipation efficiency under a reduced area. The upper surface 41 and the lower surface 42 of the heat dissipation plate 4 are opposite to each other. The first lateral wall 43 and the second lateral wall 44 are opposite to each other and disposed between the upper surface 41 and the lower surface 42. The third lateral wall 45 and the fourth lateral wall 46 are opposite to each other, disposed between the upper surface 41 and the lower surface 42, and disposed between the first lateral wall 43 and the second lateral wall 44.

The first thermal module 51, the second thermal module 52 and the third thermal module 53 are main thermal sources of the motor driver 1. The first thermal module 51 includes a plurality of electronic elements. The electronic elements disposed on the upper bridge arm of the AC/DC converter 31 of FIG. 2 form the first thermal module 51 of FIG. 1. The electronic elements disposed on the upper bridge arm of the AC/DC converter 31 of FIG. 0.2 include the first main diode Dx1, the first transistor Sx1 and the first parallel diode Dx2 of the first bridge arm 311, the third main diode Dy1, the third transistor Sy1 and the third parallel diode Dy2 of the second bridge arm 312, and the fifth main diode Dz1, the fifth transistor Sz1 and the fifth parallel diode Dz2 of the third bridge arm 313. As shown in FIG. 1, the first thermal module 51 is disposed on the upper surface 41 of the heat dissipation plate 4 and adjacent to the first lateral wall 43, the second lateral wall 44 and the third lateral wall 45. The second thermal module 52 includes a plurality of electronic elements. The electronic elements disposed on the lower bridge arm of the AC/DC converter 31 of FIG. 2 form the second thermal module 52 of FIG. 0.1. The electronic elements disposed on the lower bridge arm of the AC/DC converter 31 of FIG. 2 include the second transistor Sx2, the second main diode Dx4 and the second parallel diode Dx3 of the first bridge arm 311, the fourth transistor Sy2, the fourth main diode Dy4 and the fourth parallel diode Dy3 of the second bridge arm 312, and the sixth transistor Sz2, the sixth main diode Dz4 and the sixth parallel diode Dz3 of the third bridge arm 313. As shown in FIG. 1, the second thermal module 52 is disposed on the upper surface 41 of the heat dissipation plate 4 and adjacent to the first lateral wall 43, the second lateral wall 44 and the fourth lateral wall 46. The third thermal module 53 includes a plurality of electronic elements. The electronic elements of the DC/AC converter 33 of FIG. 2 form the third thermal module 53 of FIG. 1. The electronic elements of the DC/AC converter 33 of FIG. 2 include the seventh transistor Su1 and the eighth transistor Su2 of the sixth bridge arm 331, the ninth transistor Sv1 and the tenth transistor Sv2 of the seventh bridge arm 332, and the eleventh transistor Sw1 and the twelfth transistor Sw2 of the eighth bridge arm 333. As shown in FIG. 1, the third thermal module 53 is disposed on the lower surface 42 of the heat dissipation plate 4 and adjacent to the first lateral wall 43, the second lateral wall 44 and the fourth lateral wall 46. The third thermal module 53 and the second thermal module 52 are corresponding to each other and disposed on the two opposite sides of the heat dissipation plate 4, respectively. Namely, the second thermal module 52 and the third thermal module 53 are disposed on the upper surface 41 and the lower surface 42 of the heat dissipation plate 4, respectively. From above, the first thermal module 51 and the second thermal module 52 form the AC/DC converter 31 located in the front stage of the motor driver 1, and the third thermal module 53 forms the DC/AC converter 33 located in the rear stage of the motor driver 1.

As shown in FIG. 1, the capacitor module 6 includes a first capacitor pack 6a and a second capacitor pack 6b to from all capacitors of the capacitor module 32 of FIG. 2. Namely, the first capacitor pack 6a and the second capacitor pack 6b form the first upper capacitor Cdc1 and the first lower capacitor Cdc2 of the fourth bridge arm 321, and the second upper capacitor Cdc3 and the second lower capacitor Cdc4 of the fifth bridge arm 322. The first capacitor pack 6a is disposed on the upper surface 41 of the heat dissipation plate 4, adjacent to the first thermal module 51 and disposed between the first thermal module 51 and the second thermal module 52. The first capacitor pack 6a includes a plurality of first capacitors 61a. The plurality of first capacitors 61a are arranged from the first lateral wall 43 toward the second lateral wall 44 of the heat dissipation plate 4 in two columns. The second capacitor pack 6b is disposed on the lower surface 42 of the heat dissipation plate 4 and adjacent to the third thermal module 53. The second capacitor pack 6b and the first capacitor pack 6a are opposite to each other and symmetrically disposed on the two opposite sides of the heat dissipation plate 4, respectively. In this embodiment, the first capacitor pack 6a and the second capacitor pack 6b are disposed on the upper surface 41 and the lower surface 42 of the heat dissipation plate 4, respectively. The second capacitor pack 6b includes a plurality of second capacitors 62a. The plurality of second capacitors 62a are arranged from the first lateral wall 43 toward the second lateral wall 44 of the heat dissipation plate 4 in two columns.

The busbar module 7 includes an input portion 71, a connection portion 72 and an output portion 73. The input portion 71 of the busbar module 7 is connected with the power grid 21, so that the motor driver 1 receives the AC input power of the power grid 21 through the input portion 71. At least a part of the input portion 71 is disposed on the upper surface 41 of the heat dissipation plate 4. The connection portion 72 includes a first sub connection portion 721, a second sub connection portion 722, a third sub connection portion 723 and a fourth sub connection portion 724. A first end of the first sub connection portion 721 is connected with the input portion 71 and one side of the first thermal module 51 adjacent to the third lateral wall 45 of the heat dissipation plate 4. A second end of the first sub connection portion 721 is connected with one side of the second thermal module 52 adjacent to the fourth lateral wall 46 of the heat dissipation plate 4. The first thermal module 51, at least a part of the first capacitor pack 6a and the second thermal module 52 are disposed between at least a part of the first sub connection portion 721 and the upper surface 41 of the heat dissipation plate 4. The second sub connection portion 722 is disposed between the upper surface 41 of the heat dissipation plate 4 and the first capacitor pack 6a. The second sub connection portion 722 is connected between the first thermal module 51 and the second thermal module 52. The third sub connection portion 723 is disposed between the lower surface 42 of the heat dissipation plate 4 and the second capacitor pack 6b, and connected with the third thermal module 53. A first end of the fourth sub connection portion 724 is connected with one side of the second sub connection portion 722 adjacent to the second lateral wall 44 of the heat dissipation plate 4. A second end of the fourth sub connection portion 724 is connected with one side of the third sub connection portion 723 adjacent to the second lateral wall 44 of the heat dissipation plate 4. As least a part of the fourth sub connection portion 724 is connected with the second lateral wall 44 of the heat dissipation plate 4 to be connected between the first end and the second end of the fourth sub connection portion 724. The output portion 73 is connected between the third thermal nodule 53 and the motor 22. The output portion 73 is disposed on the lower surface 42 of the heat dissipation plate 4 adjacent to the fourth lateral wall 46 of the heat dissipation plate 4. The motor driver 1 outputs the AC output power converted by the third thermal module 53 to the motor 22 through the output portion 73.

Omitting the power grid 21 and the motor 22, the motor driver 1 of this embodiment includes two power transmission paths. The first transmission path passes through the input portion 71 of the busbar module 7, the first thermal module 51, the second sub connection portion 722 (the first capacitor pack 6a), the fourth sub connection portion 724, the third sub connection portion 723 (the second capacitor pack 6b), the third thermal module 53 and the output portion 73 in sequence. The second transmission path passes through the input portion 71 of the busbar module 7, the first sub connection portion 721, the second thermal module 52, the second sub connection portion 722 (the first capacitor pack 6a), the fourth sub connection portion 724, the third sub connection portion 723 (the second capacitor pack 6b), the third thermal module 53 and the output portion 73 in sequence.

From above, two of the three thermal modules (i.e., the first thermal module 51 and the second thermal module 52) of the motor driver 1 of the present disclosure are disposed on the upper surface 41 of the heat dissipation plate 4. One of the three thermal modules (i.e., the third thermal module 53) of the motor driver 1 of the present disclosure is disposed on the lower surface 42 of the heat dissipation plate 4. The heat dissipation plate 4 is constructed by a water cooling plate or a liquid cooling plate for dissipating the heat with two surfaces of the heat dissipation plate 4. Namely, the motor driver 1 of the present disclosure has double-sided cooling technology for enhancing the available area of assembling and the heat dissipation density of the heat dissipation plate 4 and reducing the volume of heat dissipation plate 4 so as to enhance the power density of the motor driver 1. Moreover, the first capacitor pack 6a and the second capacitor pack 6b of the motor driver 1 are symmetrically disposed on the two opposite sides of the heat dissipation plate 4. The first capacitor pack 6a and the second capacitor pack 6b are connected with each other thorough the fourth sub connection portion 724 which has a reduced distance. Consequently, the power transmission path is reduced so as to reduce the loop leakage inductance. Moreover, the capacitor module 6 has advantage of equalizing current and reducing cost.

Figure 3:
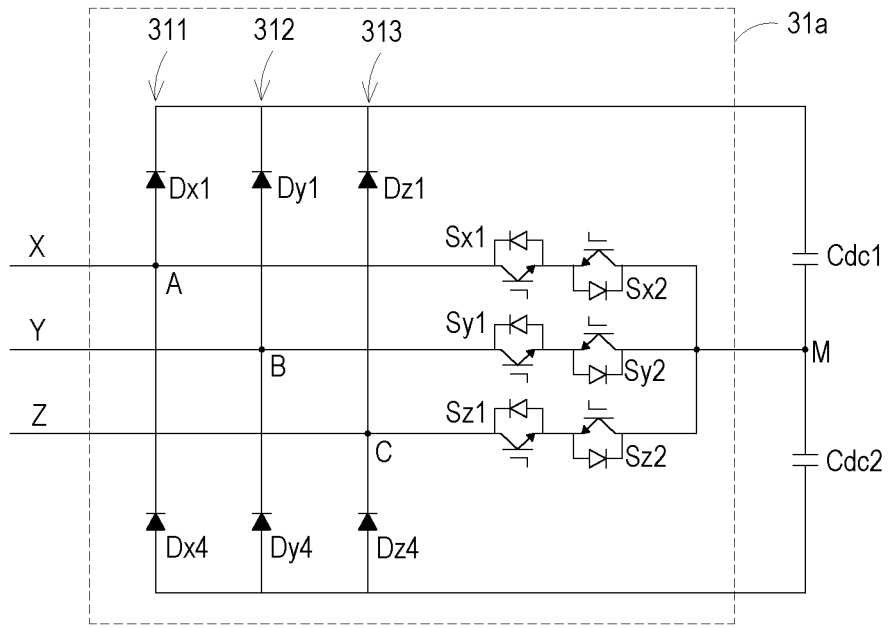
FIG. 3 is a schematic equivalent circuit diagram illustrating a second embodiment of the motor driver of the present disclosure.

FIG. 3 is a schematic equivalent circuit diagram illustrating a second embodiment of the motor driver of the present disclosure. The circuit diagram of FIG. 3 is similar to the circuit diagram of FIG. 2, and will be described below. Compared with the AC/DC converter 31 of FIG. 2, as shown in FIG. 3, the AC/DC converter 31a of this embodiment only includes the first main diode Dx1 and the second main diode Dx4. A connection node between the first main diode Dx1 and the second main diode Dx4 is a first node A. The first node A is connected with the X phase of power grid 21. The second bridge arm 312 only includes the third main diode Dy1 and the fourth main diode Dy4. A connection node between the third main diode Dy1 and the fourth main diode Dy4 is a second node B. The second node B is connected with the Y phase of the power grid 21. The third bridge arm 313 only includes the fifth main diode Dz1 and the sixth main diode Dz4. A connection node between the fifth main diode Dz1 and the sixth main diode Dz4 is a third node C. The third node C is connected with the Z phase of the power grid 21. In this embodiment, the first transistor Sx1 and the second transistor Sx2 of the AC/DC converter 31a is connected between the first node A and the thirteenth node M of the capacitor module 32 in series. The third transistor Sy1 and the fourth transistor Sy2 of the AC/DC converter 31a is connected between the second node B and the thirteenth node M of the capacitor module 32 in series. The fifth transistor Sz1 and the sixth transistor Sz2 of the AC/DC converter 31a is connected between the third node C and the thirteenth node M of the capacitor module 32 in series. In this embodiment, the first thermal module 51 includes the first main diode Dx1 and the first transistor Sx1 of the first bridge arm 311, the third main diode Dy1 and the third transistor Sy1 of the second bridge arm 312, and the fifth main diode Dz1 and the fifth transistor Sz1 of the third bridge arm 313. The second thermal module 52 includes the second main diode Dx4 and the second transistor Sx2 of the first bridge arm 311, the fourth main diode Dy4 and the fourth transistor Sy2 of the second bridge arm 312, and the sixth main diode Dz4 and the sixth transistor Sz2 of the third bridge arm 313.

Figure 4:
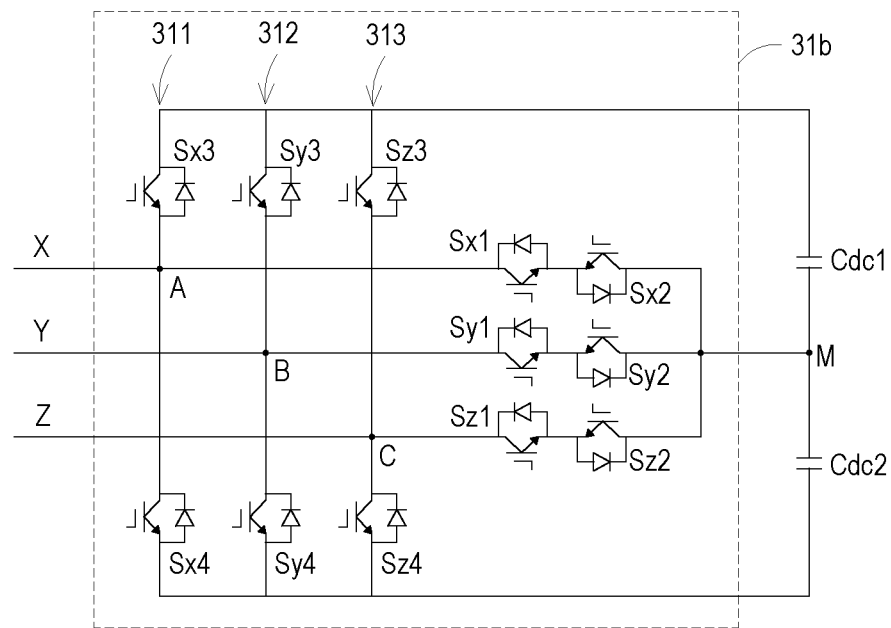
FIG. 4 is a schematic equivalent circuit diagram illustrating a third embodiment of the motor driver of the present disclosure.

FIG. 4 is a schematic equivalent circuit diagram illustrating a third embodiment of the motor driver of the present disclosure. The circuit diagram of FIG. 4 is similar to the circuit diagram of FIG. 2, and will be described below. The first bridge arm 311, the second bridge arm 312 and the third bridge arm 313 of the AC/DC converter 31a of FIG. 3 only include diodes, respectively. Compared with the AC/DC converter 31a of FIG. 3, as shown in FIG. 4, the first bridge arm 311 of the AC/DC converter 31b of this embodiment includes a thirteenth transistor Sx3 and a fourteenth transistor Sx4. The second bridge arm 312 of the AC/DC converter 31b of this embodiment includes a fifteenth transistor Sy3 and a sixteenth transistor Sy4. The third bridge arm 313 of the AC/DC converter 31b of this embodiment includes a seventeenth transistor Sz3 and an eighteenth transistor Sz4.

In this embodiment, the definition of the electronic elements of FIG. 4 forming the first thermal module 51 and the second thermal module 52 is similar to the definition of the electronic elements of FIG. 3 forming the first thermal module 51 and the second thermal module 52, and is not redundantly described hereafter.

Figure 5:
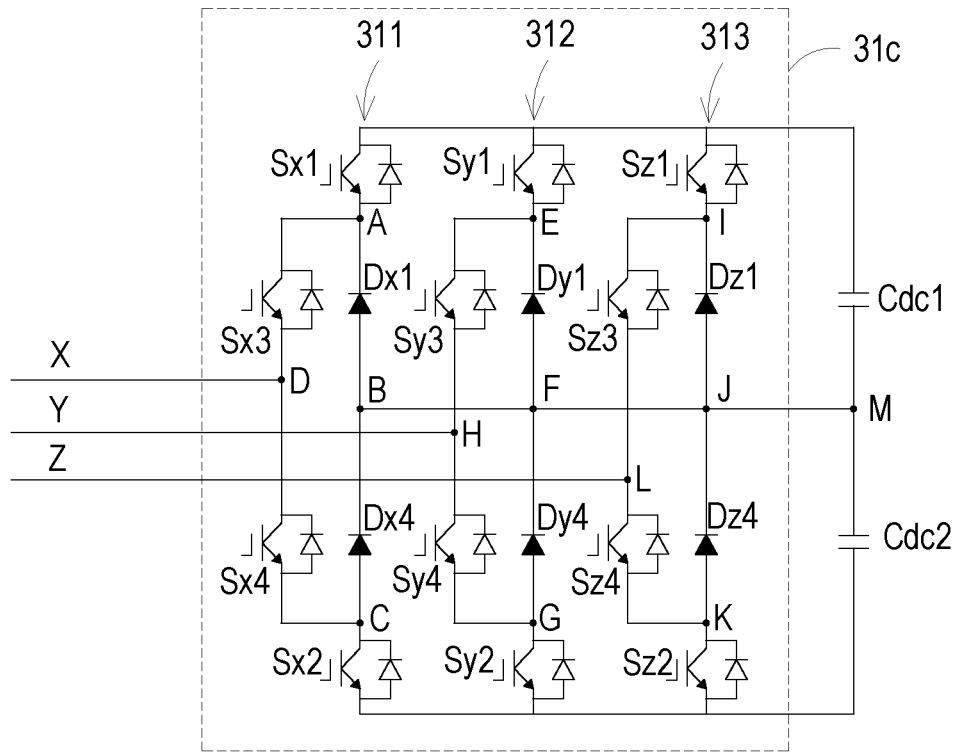
FIG. 5 is a schematic equivalent circuit diagram illustrating a fourth embodiment of the motor driver of the present disclosure.

FIG. 5 is a schematic equivalent circuit diagram illustrating a fourth embodiment of the motor driver of the present disclosure. The circuit diagram of FIG. 5 is similar to the circuit diagram of FIG. 2, and will be described below. Compared with the AC/DC converter 31 of FIG. 2, the first bridge arm 311 of the AC/DC converter 31c of this embodiment includes a first transistor Sx1, a first main diode Dx1, a second main diode Dx4, a second transistor Sx2, a first parallel transistor Sx3 and a second parallel transistor Sx4. The first transistor Sx1, the first main diode Dx1, the second main diode Dx4 and the second transistor Sx2 are connected in series and in sequence. A connection node between the first transistor Sx1 and the first main diode Dx1 is a first node A. A connection node between the first main diode Dx1 and the second main diode Dx4 is a second node B. A connection node between the second main diode Dx4 and the second transistor Sx2 is a third node C. The first parallel transistor Sx3 and the second parallel transistor Sx4 are connected between the first node A and the third node C in series. A connection node between the first parallel transistor Sx3 and the second parallel transistor Sx4 is a fourth node D. The fourth node D is connected with the X phase of power grid 21.

The second bridge arm 312 of the AC/DC converter 31c of this embodiment includes a third transistor Sy1, a third main diode Dy1, a fourth main diode Dy4, a fourth transistor Sy2, a third parallel transistor Sy3 and a fourth parallel transistor Sy4. The third transistor Sy1, the third main diode Dy1, the fourth main diode Dy4 and the fourth transistor Sy2 are connected in series and in sequence. A connection node between the third transistor Sy1 and the third main diode Dy1 is a fifth node E. A connection node between the third main diode Dy1 and the fourth main diode Dy4 is a sixth node F. A connection node between the fourth main diode Dy4 and the fourth transistor Sy2 is a seventh node G. The third parallel transistor Sy3 and the fourth parallel transistor Sy4 are connected between the fifth node E and the seventh node G in series. A connection node between the third parallel transistor Sy3 and the fourth parallel transistor Sy4 is an eighth node H. The eighth node H is connected with the Y phase of the power grid 21.

The third bridge arm 313 of the AC/DC converter 31c of this embodiment includes a fifth transistor Sz1, a fifth main diode Dz1, a sixth main diode Dz4, a sixth transistor Sz2, a fifth parallel transistor Sz3 and a sixth parallel transistor Sz4. The fifth transistor Sz1, the fifth main diode Dz1, the sixth main diode Dz4 and the sixth transistor Sz2 are connected in series and in sequence. A connection node between the fifth transistor Sz1 and the fifth main diode Dz1 is a ninth node I. A connection node between the fifth main diode Dz1 and the sixth main diode Dz4 is a tenth node J. A connection node between the sixth main diode Dz4 and the sixth transistor Sz2 is an eleventh node K. The fifth parallel transistor Sz3 and the sixth parallel transistor Sz4 are connected between the ninth node I and the eleventh node K in series. A connection node between the fifth parallel transistor Sz3 and the sixth parallel transistor Sz4 is a twelfth node L. The twelfth node L is connected with the Z phase of the power grid 21.

In this embodiment, the first thermal module 51 of the motor driver includes the first transistor Sx1, the first main diode Dx1 and the first parallel transistor Sx3 of the first bridge arm 311, the third transistor Sy1, the third main diode Dy1 and the third parallel transistor Sy3 of the second bridge arm 312, and the fifth transistor Sz1, the fifth main diode Dz1 and the fifth parallel transistor Sz3 of the third bridge arm 313. The second thermal module 52 of the motor driver includes the second main diode Dx4, the second transistor Sx2 and the second parallel transistor Sx4 of the first bridge arm 311, the fourth main diode Dy4, the fourth transistor Sy2 and the fourth parallel transistor Sy4 of the second bridge arm 312, and the sixth main diode Dz4, the sixth transistor Sz2 and the sixth parallel transistor Sz4 of the third bridge arm 313.

Figure 6:
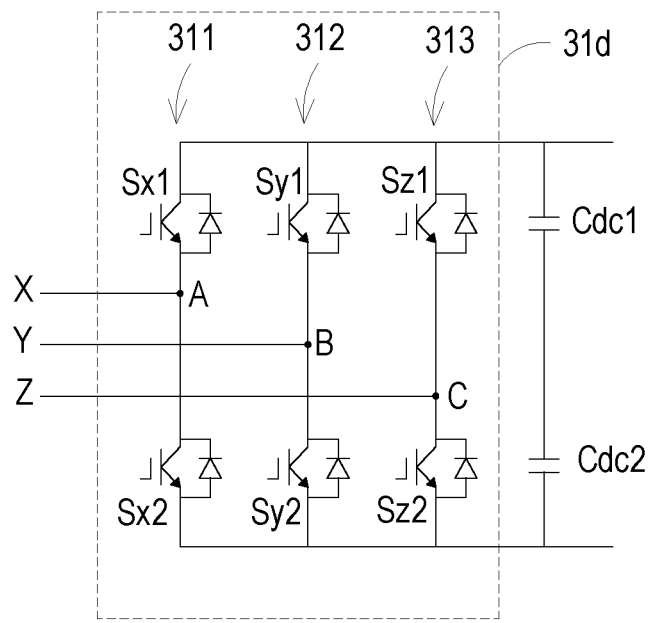
FIG. 6 is a schematic equivalent circuit diagram illustrating a fifth embodiment of the motor driver of the present disclosure.

In the above embodiments, the AC/DC converter is applied to the three-level converter. In some embodiments, the AC/DC converter can be applied to the two-level converter. FIG. 6 is a schematic equivalent circuit diagram illustrating a fifth embodiment of the motor driver of the present disclosure. As embodiments shown in FIGS. 2 and 6, and in this embodiment in FIG. 6, the AC/DC converter 31d is a two-level converter to form the first thermal module 51 and the second thermal module 52 of FIG. 1. The first bridge arm 311 of the AC/DC converter 31d only includes the first transistor Sx1 and the second transistor Sx2. The first transistor Sx1 and the second transistor Sx2 are connected with each other in series. A connection node between the first transistor Sx1 and the second transistor Sx2 is a first node A. The first node A is connected with the X phase of the power grid 21. The second bridge arm 312 of the AC/DC converter 31d only includes the third transistor Sy1 and the fourth transistor Sy2. The third transistor Sy1 and the fourth transistor Sy2 are connected with each other in series. A connection node between the third transistor Sy1 and the fourth transistor Sy2 is a second node B. The second node B is connected with the Y phase of the power grid 21. The third bridge arm 313 of the AC/DC converter 31d only includes the fifth transistor Sz1 and the sixth transistor Sz2. The fifth transistor Sz1 and the sixth transistor Sz2 are connected with each other in series. A connection node between the fifth transistor Sz1 and the sixth transistor Sz2 is a third node C. The third node C is connected with the Z phase of the power grid 21.

Figure 7:
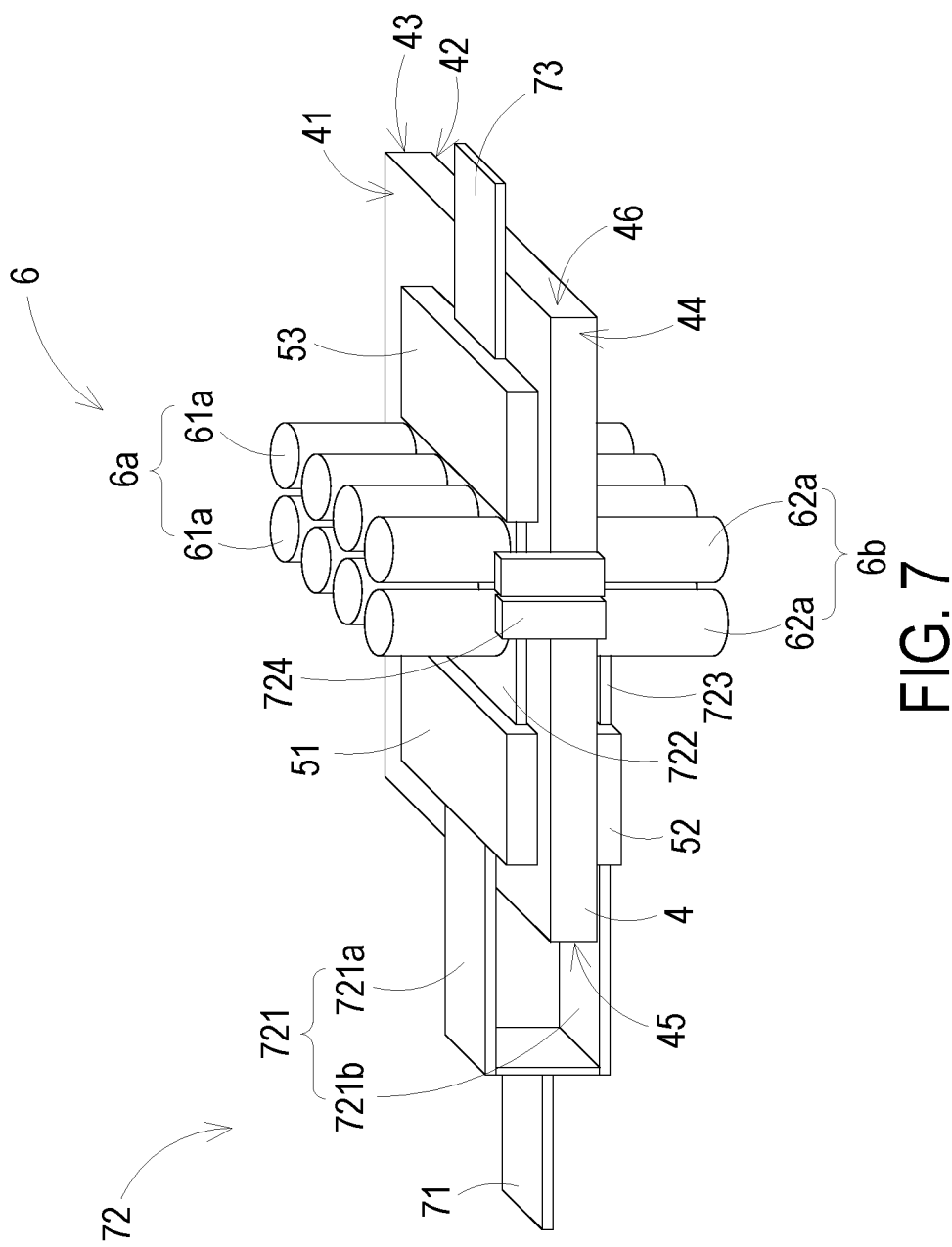
FIG. 7 is a schematic perspective view illustrating a motor driver according to a second embodiment of the present disclosure.

In some embodiments, the arrangement of the three thermal modules can be adjusted to utilize the heat dissipation area of the heat dissipation plate and match the arrangement of the other elements of the motor driver. FIG. 7 is a schematic perspective view illustrating a motor driver according to a second embodiment of the present disclosure. As shown in FIG. 7, the motor driver 1a of this embodiment can formed by the equivalent circuit diagram of FIGS. 2 to 6. Compared with the motor driver 1 of FIG. 1, the first thermal module 51 of the motor driver 1a of this embodiment is disposed on the upper surface 41 of the heat dissipation plate 4 and adjacent to the first lateral wall 43, the second lateral wall 44 and the third lateral wall 45 of the heat dissipation plate 4. The second thermal module 52 of the motor driver 1a of this embodiment is disposed on the lower surface 42 of the heat dissipation plate 4 and adjacent to the first lateral wall 43, the second lateral wall 44 and the third lateral wall 45 of the heat dissipation plate 4. The second thermal module 52 and the first thermal module 51 are disposed on the two opposite sides of the heat dissipation plate 4, respectively. The third thermal module 53 of the motor driver 1a of this embodiment is disposed on the upper surface 41 of the heat dissipation plate 4 and adjacent to the first lateral wall 43, the second lateral wall 44 and the fourth lateral wall 46. The capacitor module 6 includes a first capacitor pack 6a and a second capacitor pack 6b. The first capacitor pack 6a is disposed on the upper surface 41 of the heat dissipation plate 4 and disposed between the first thermal module 51 and the third thermal module 53. The first capacitor pack 6a includes a plurality of first capacitors 61a. The plurality of first capacitors 61a are arranged from the first lateral wall 43 toward the second lateral wall 44 of the heat dissipation plate 4 in two columns. The second capacitor pack 6b is disposed on the lower surface 42 of the heat dissipation plate 4 and adjacent to the second thermal module 52. The second capacitor pack 6b and the first capacitor pack 6a are opposite to each other and symmetrically disposed on the two opposite sides of the heat dissipation plate 4, respectively. The second capacitor pack 6b includes a plurality of second capacitors 62a. The plurality of second capacitors 62a are arranged from the first lateral wall 43 toward the second lateral wall 44 of the heat dissipation plate 4 in two columns.

In this embodiment, the connection portion 72 of the busbar module 7 of the motor driver 1a includes a first sub connection portion 721, a second sub connection portion 722, a third sub connection portion 723 and a fourth sub connection portion 724. The first sub connection portion 721 includes an upper connection part 721a and a lower connection part 721b. A first end of the upper connection part 721a of the first sub connection portion 721 is connected with the input portion 71. A second end of the upper connection part 721a of the first sub connection portion 721 is connected with the first thermal module 51. At least a part of the upper connection part 721a is disposed on the upper surface 41 of the heat dissipation plate 4 adjacent to the third lateral wall 45 of the heat dissipation plate 4. A first end of the lower connection part 721b of the first sub connection portion 721 is connected with the input portion 71. A second end of the lower connection part 721b of the first sub connection portion 721 is connected with the second thermal module 52. At least a part of the lower connection part 721b is disposed on the lower surface 42 of the heat dissipation plate 4 adjacent to the third lateral wall 45 of the heat dissipation plate 4. The second sub connection portion 722 is disposed between the upper surface 41 of the heat dissipation plate 4 and the first capacitor pack 6a, and connected between the first thermal module 51 and the third thermal module 53. The third sub connection portion 723 is disposed between the lower surface 42 of the heat dissipation plate 4 and the second capacitor pack 6b, and connected with the second thermal module 52. A first end of the fourth sub connection portion 724 is connected with one side of the second sub connection portion 722 adjacent to the second lateral wall 44 of the heat dissipation plate 4. A second end of the fourth sub connection portion 724 is connected with one side of the third sub connection portion 723 adjacent to the second lateral wall 44 of the heat dissipation plate 4. As least a part of the fourth sub connection portion 724 is connected with the second lateral wall 44 of the heat dissipation plate 4 to be connected between the first end and the second end of the fourth sub connection portion 724. The output portion 73 of the busbar module 7 is connected between the third thermal nodule 53 and the motor 22. The output portion 73 is disposed on the upper surface 41 of the heat dissipation plate 4 adjacent to the fourth lateral wall 46 of the heat dissipation plate 4. Omitting the power grid 21 and the motor 22, the motor driver 1a of this embodiment includes two power transmission paths. The first transmission path passes through the input portion 71 of the busbar nodule 7, the upper connection part 721a of the first sub connection portion 721, the first thermal module 51, the second sub connection portion 722 (the first capacitor pack 6a), the third thermal module 53 and the output portion 73 in sequence. The second transmission path passes through the input portion 71 of the busbar module 7, the lower connection part 721b of the first sub connection portion 721, the second thermal module 52, the third sub connection portion 723 (the second capacitor pack 6b), the fourth sub connection portion 724, the second sub connection portion 722 (the first capacitor pack 6a), the third thermal module 53 and the output portion 73 in sequence.

Figure 8A:
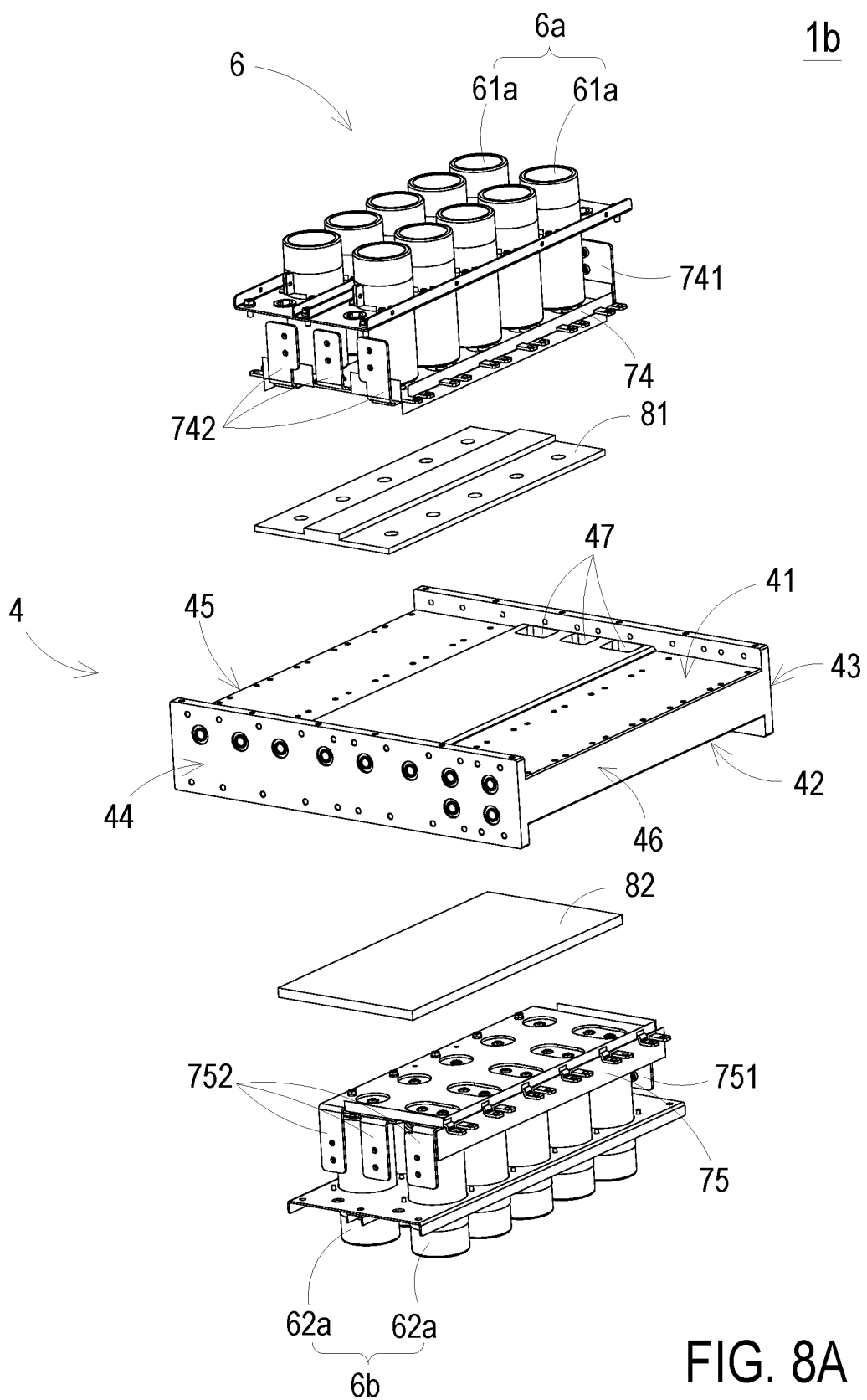
FIG. 8A is an exploded perspective view illustrating a motor driver according to a third embodiment of the present disclosure.
Figure 8B:
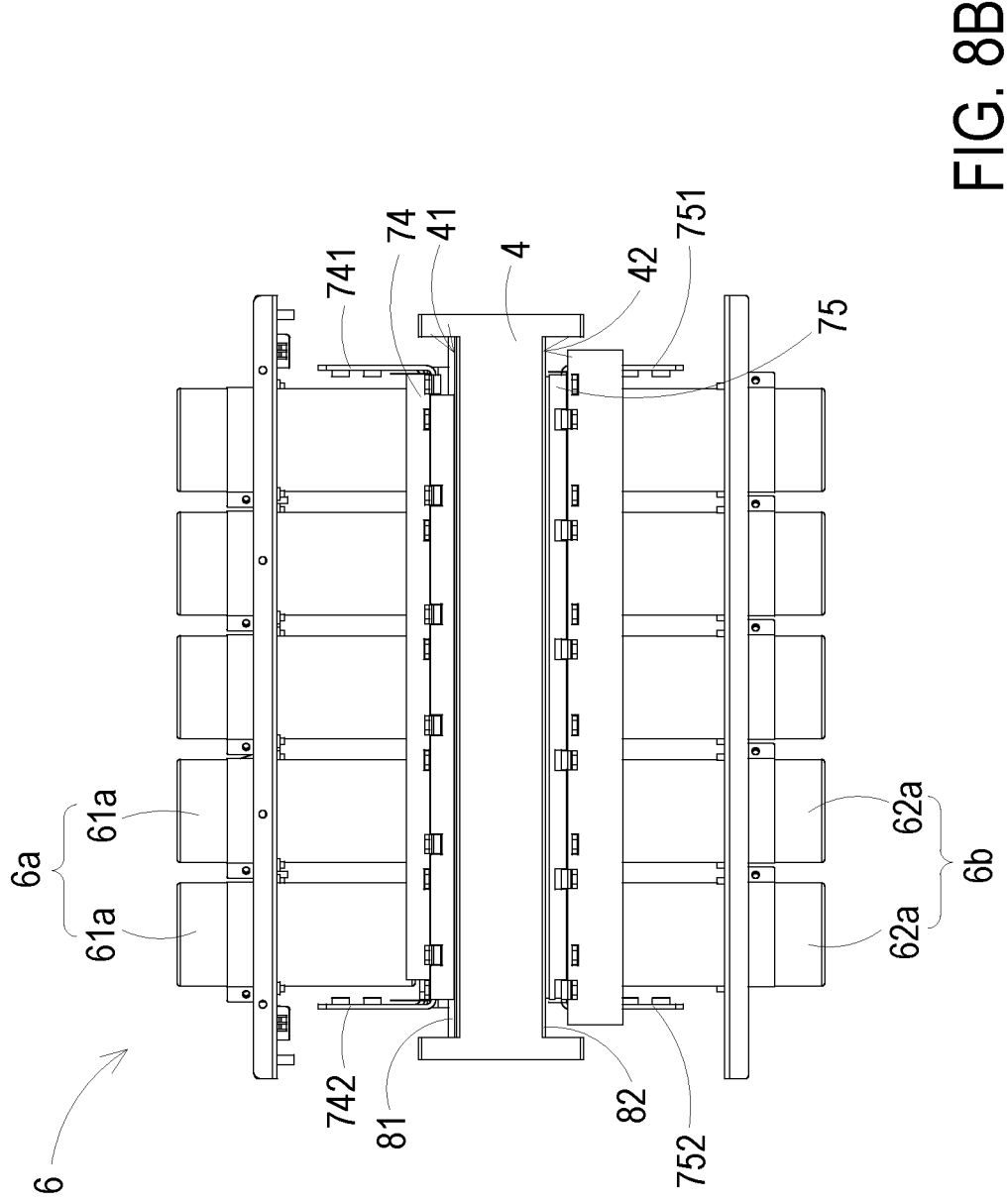
FIG. 8B is a side view illustrating the motor driver of FIG. 8A.

FIG. 8A is an exploded perspective view illustrating a motor driver according to a third embodiment of the present disclosure. FIG. 8B is a side view illustrating the motor driver of FIG. 8A. As shown in FIGS. 8A and 8B, compared with the motor driver 1 of FIG. 1, the heat dissipation plate 4 of the motor driver 1b of this embodiment includes a plurality of first holes 47 and a plurality of second holes running through the upper surface 41 and the lower surface 42 of the heat dissipation plate 4. The plurality of first holes 47 are arranged in sequence and adjacent to the first lateral wall 43 of the heat dissipation plate 4. The plurality of second holes are not shown in FIG. 8A due to the perspective of the diagram. However, it is clear that the plurality of second holes and the plurality of first holes 47 are corresponding to each other in a one-to-one relationship. Namely, the plurality of second holes are arranged in sequence and adjacent to the second lateral wall 44 of the heat dissipation plate 4. For dissipating the heat of the motor driver 1b, the motor driver 1b includes a first thermal pad 81 and a second thermal pad 82. The first thermal pad 81 is disposed on the upper surface 41 of the heat dissipation plate 4 and does not cover the plurality of first holes 47 and the plurality of second holes. The second thermal pad 82 is disposed on the lower surface 42 of the heat dissipation plate 4 and does not cover the plurality of first holes 47 and the plurality of second holes.

The busbar module 7 of the motor driver 1b of this embodiment includes a first busbar 74 and a second busbar 75. The first busbar 74 is disposed on the first thermal pad 81. The first capacitor pack 6a of the capacitor module 6 is disposed on the first busbar 74, so that the first busbar 74 and the first capacitor pack 6a of the capacitor module 6 dissipate the heat efficiently through the heat dissipation path built by the first thermal pad 81 and the heat dissipation plate 4. The first busbar 74 includes a plurality of first busbar connection terminals 741 and a plurality of second busbar connection terminals 742. The plurality of first busbar connection terminals 741 are adjacent to the first lateral wall 43 of the heat dissipation plate 4. The first busbar connection terminals 741 and the first holes 47 are spatially corresponding in position to each other. The plurality of second busbar connection terminals 742 are adjacent to the second lateral wall 44 of the heat dissipation plate 4. The second busbar connection terminals 742 and the second holes are spatially corresponding in position to each other. Consequently, the distance between the first capacitor pack 6a and the first thermal pad 81 is reduced so as to enhance the heat dissipation efficiency. The second busbar 75 is disposed on the second thermal pad 82. The second capacitor pack 6b of the capacitor module 6 is disposed on the second busbar 75, so that the second busbar 75 and the second capacitor pack 6b of the capacitor module 6 dissipate the heat efficiently through the heat dissipation path built by the second thermal pad 82 and the heat dissipation plate 4. The second busbar 75 includes a plurality of third busbar connection terminals 751 and a plurality of fourth busbar connection terminals 752. The plurality of third busbar connection terminals 751 are adjacent to the first lateral wall 43 of the heat dissipation plate 4. The third busbar connection terminal 751 and the first holes 47 are spatially corresponding in position to each other. The plurality of fourth busbar connection terminals 752 are adjacent to the second lateral wall 44 of the heat dissipation plate 4. The fourth busbar connection terminals 752 and the second holes are spatially corresponding in position to each other. Consequently, the distance between the second capacitor pack 6b and the second thermal pad 82 is reduced so as to enhance the heat dissipation efficiency.

In some embodiments, the first busbar connection terminals 741 of the first busbar 74 and the third busbar connection terminals 751 of the second busbar 75 are fixed with each other through the first holes 47. The second busbar connection terminals 742 of the first busbar 74 and the fourth busbar connection terminals 752 of the second busbar 75 are fixed with each other through the second holes. Consequently, the distance of the connection path between the first busbar 74 and the second busbar 75 of the motor driver 1b of this embodiment is reduced so as to reduce the leakage inductance. In this embodiment, the thermal modules are not shown in FIGS. 8A and 8B. However, the first thermal module 51, the second thermal module 52 and the third thermal module 53 can be arranged between the first busbar 74 and the first thermal pad 81, or arranged between the second busbar 75 and the second thermal pad 82, so that the heat produced by the thermal modules is transmitted to the exterior of the motor driver 1b through the first thermal pad 81, the second thermal pad 82 and the heat dissipation plate 4.

From the above descriptions, the present disclosure provides the motor driver. Two of the three thermal modules (i.e., the first thermal module and the second thermal module) of the motor driver of the present disclosure are disposed on the upper surface of the heat dissipation plate. One of the three thermal modules (i.e., the third thermal module) of the motor driver of the present disclosure is disposed on the lower surface of the heat dissipation plate. The heat dissipation plate is constructed by a water cooling plate or a liquid cooling plate for dissipating the heat with both of the two surfaces of the heat dissipation plate. Namely, the motor driver of the present disclosure has double-sided cooling technology for enhancing the available area of assembling and the heat dissipation density of the heat dissipation plate and reducing the volume of the heat dissipation plate, so as to enhance the power density of the motor driver. Moreover, the first capacitor pack and the second capacitor pack of the motor driver are symmetrically disposed on the two opposite sides of the heat dissipation plate. The first capacitor pack and the second capacitor pack are connected with each other thorough the fourth sub connection portions which result in reduced distance. Consequently, the power transmission path is reduced so as to reduce the loop leakage inductance. Moreover, the capacitor module has advantage of equalizing current and reducing cost.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor driver, comprising:
   an AC/DC converter converting an AC input power to a DC power and comprising a first thermal module, a second thermal module, a first capacitor pack and a second capacitor pack;
   a DC/AC converter connected with the AC/DC converter, converting the DC power to an AC output power, and comprising a third thermal module;
   a heat dissipation plate comprising an upper surface and a lower surface, wherein the first thermal module is disposed on the upper surface, one of the second thermal module and the third thermal module is disposed on the lower surface and the other one of the second thermal module and the third thermal module is disposed on the upper surface, wherein the first capacitor pack is disposed on the upper surface, and the second capacitor pack is disposed on the lower surface and corresponding to the first capacitor pack; and
   a busbar module comprising an input portion, a connection portion and an output portion, wherein the connection portion is connected with the input portion, the first thermal module, the second thermal module, the third thermal module, the first capacitor pack and the second capacitor pack, and the output portion is connected with the third thermal module.

2. The motor driver according to claim 1, wherein the AC/DC converter is applied to a three-level converter or a two-level converter, and the first capacitor pack and the second capacitor pack are DC power storage capacitors for storing the DC power.

3. The motor driver according to claim 1, wherein the heat dissipation plate is constructed by a water cooling plate or a liquid cooling plate.

4. The motor driver according to claim 1, wherein the heat dissipation plate comprises a first lateral wall, a second lateral wall, a third lateral wall and a fourth lateral wall, the first lateral wall and the second lateral wall are opposite to each other and disposed between the upper surface and the lower surface, and the third lateral wall and the fourth lateral wall are opposite to each other and disposed between the upper surface and the lower surface.

5. The motor driver according to claim 4, wherein the first thermal module is disposed on the upper surface and adjacent to the third lateral wall, the second thermal module is disposed on the upper surface and adjacent to the fourth lateral wall, and the third thermal module is disposed on the lower surface and adjacent to the fourth lateral wall.

6. The motor driver according to claim 5, wherein the connection portion comprises a first sub connection portion, a second sub connection portion, a third sub connection portion and a fourth sub connection portion, and a first end of the first sub connection portion is connected with the first thermal module and the input portion, a second end of the first sub connection portion is connected with the second thermal module, and the first thermal module, the second thermal module and the first capacitor pack are disposed between the first sub connection portion and the upper surface;
   the second sub connection portion is disposed between the upper surface and the first capacitor pack, and is connected between the first thermal module and the second thermal module;
   the third sub connection portion is disposed between the lower surface and the second capacitor pack, and is connected with the third thermal module; and
   the fourth sub connection portion is connected between the second sub connection portion and the third sub connection portion.

7. The motor driver according to claim 4, wherein the first thermal module is disposed on the upper surface and adjacent to the third lateral wall, the second thermal module is disposed on the lower surface and adjacent to the third lateral wall, and the third thermal module is disposed on the upper surface and adjacent to the fourth lateral wall.

8. The motor driver according to claim 7, wherein the connection portion comprises a first sub connection portion, a second sub connection portion, a third sub connection portion and a fourth sub connection portion, the first sub connection portion is connected with the input portion, the first thermal module and the second thermal module, and adjacent to the third lateral wall;
- the second sub connection portion is disposed between the upper surface and the first capacitor pack, and is connected between the first thermal module and the third thermal module;
- the third sub connection portion is disposed between the lower surface and the second capacitor pack, and is connected with the second thermal module; and
- the fourth sub connection portion is connected between the second sub connection portion and the third sub connection portion.

9. A motor driver, comprising:
- an AC/DC converter converting an AC input power to a DC power, and comprising a first thermal module, a first capacitor pack and a second capacitor pack;
- a DC/AC converter connected with the AC/DC converter, converting the DC power to an AC output power, and comprising a second thermal module;
- a heat dissipation plate comprising an upper surface and a lower surface, wherein the first thermal module is disposed on the upper surface, the second thermal module is disposed on the upper surface or the lower surface, the first capacitor pack is disposed on the upper surface, and the second capacitor pack is disposed on the lower surface and corresponding to the first capacitor pack; and
- a busbar module comprising a first busbar and a second busbar, wherein the first busbar is disposed between the upper surface and the first capacitor pack and comprises at least one busbar connection terminal, the second busbar is disposed between the lower surface and the second capacitor pack and comprises at least one busbar connection terminal, wherein the at least one busbar connection terminal of the first busbar and the at least one busbar connection terminal of the second busbar penetrate through the heat dissipation plate to connect with each other, wherein the first thermal module of the AC/DC converter is disposed between the upper surface and the first busbar, and the second thermal module of the DC/AC converter is disposed between the lower surface and the second busbar.

10. The motor driver according to claim 9, further comprising a first thermal pad and a second thermal pad, wherein the first thermal pad is disposed between the upper surface and the first thermal module, or disposed between the upper surface and the first busbar, wherein the second thermal pad is disposed between the lower surface and the second thermal module, or disposed between the lower surface and second busbar.

* * * * *